(12) United States Patent
Soeda et al.

(10) Patent No.: US 12,649,305 B2
(45) Date of Patent: Jun. 9, 2026

(54) POLYMER MEMBER/INORGANIC BASE COMPOSITE, PRODUCTION METHOD THEREFOR, AND POLYMER MEMBER THEREFOR

(71) Applicant: TEIJIN LIMITED, Osaka (JP)

(72) Inventors: Junshi Soeda, Osaka (JP); Yoshinori Ikeda, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 18/220,343

(22) Filed: Jul. 11, 2023

(65) Prior Publication Data

US 2023/0347636 A1 Nov. 2, 2023

Related U.S. Application Data

(62) Division of application No. 17/435,893, filed as application No. PCT/JP2020/009831 on Mar. 6, 2020, now abandoned.

(30) Foreign Application Priority Data

Mar. 8, 2019 (JP) ................................. 2019-043196
Dec. 4, 2019 (JP) ................................. 2019-219698

(51) Int. Cl.
*B32B 27/32* (2006.01)
*B32B 7/04* (2019.01)
(Continued)

(52) U.S. Cl.
CPC .............. *B32B 27/325* (2013.01); *B32B 7/04* (2013.01); *B32B 9/045* (2013.01); *B32B 15/085* (2013.01)

(58) Field of Classification Search
None
See application file for complete search history.

(56) References Cited

U.S. PATENT DOCUMENTS

2006/0211809 A1* 9/2006 Kodemura ............ C08F 265/02
                                                       524/502
2011/0164322 A1 7/2011 Morozumi et al.
(Continued)

FOREIGN PATENT DOCUMENTS

CN 102139547 A 8/2011
EP 0720533 B1 3/1999
(Continued)

OTHER PUBLICATIONS

Machine translation of JP 2007-261052 A (Year: 2007).*
(Continued)

*Primary Examiner* — Ramsey Zacharia
(74) *Attorney, Agent, or Firm* — Sughrue Mion, PLLC

(57) ABSTRACT

A composite of polymer member and inorganic substrate, a method of manufacturing the same, and a polymer member therefor are provided. A method for manufacturing a composite 210, 220 of polymer member and inorganic substrate includes: providing a composite 110, 120 of thermally modified polymer layer and inorganic substrate in which one or more thermally modified polymer layers 20, 21, 22 are adhered onto an inorganic substrate 10, and bonding a polymer member 30, 31, 32 to the inorganic substrate via the one or more thermally modified polymer layers 20, 21, 22.

7 Claims, 1 Drawing Sheet

(51) Int. Cl.
      *B32B 9/04*          (2006.01)
      *B32B 15/085*        (2006.01)

(56)              References Cited

U.S. PATENT DOCUMENTS

| | | | |
|---|---|---|---|
| 2014/0349127 A1 | 11/2014 | Minamide et al. | |
| 2016/0154153 A1* | 6/2016 | Tsunoda | C08K 5/56 |
| | | | 359/360 |
| 2016/0257809 A1* | 9/2016 | Biondini | C08K 3/016 |
| 2017/0028691 A1* | 2/2017 | Hudina | B32B 27/306 |
| 2017/0139084 A1* | 5/2017 | Shimada | B05D 1/02 |
| 2018/0102514 A1 | 4/2018 | Dai et al. | |
| 2018/0258273 A1* | 9/2018 | Hosoya | G02B 1/111 |
| 2020/0073018 A1* | 3/2020 | Uchida | G02F 1/3505 |
| 2020/0103557 A1* | 4/2020 | Kawada | G02B 1/111 |
| 2022/0033598 A1* | 2/2022 | Noguchi | G02B 1/041 |
| 2022/0176684 A1 | 6/2022 | Soeda et al. | |

FOREIGN PATENT DOCUMENTS

| | | | | |
|---|---|---|---|---|
| JP | 59-50401 A | | 3/1984 | |
| JP | 2006-138898 A | | 6/2006 | |
| JP | 2006-227419 A | | 8/2006 | |
| JP | 2006312706 A | * | 11/2006 | C03C 3/093 |
| JP | 2007-25078 A | | 2/2007 | |
| JP | 2007261052 A | * | 10/2007 | |
| JP | 2011-122005 A | | 6/2011 | |
| JP | 2013-103456 A | | 5/2013 | |
| JP | 2013209501 A | * | 10/2013 | |
| JP | 2016-212193 A | | 12/2016 | |
| JP | 2017-116759 A | | 6/2017 | |
| JP | 2018-141158 A | | 9/2018 | |
| WO | 2016/177448 A1 | | 11/2016 | |
| WO | 2019/008898 A1 | | 1/2019 | |

OTHER PUBLICATIONS

Machine translation of JP 2013-209501 A (Year: 2013).*
Machine translation of JP 2006-312706 A (Year: 2006).*
MatWeb: Overview of materials for Polypropylene, Molded (Year: 2025).*
International Search Report for PCT/JP2020/009831 dated May 26, 2020 (PCT/ISA/210).

* cited by examiner

POLYMER MEMBER/INORGANIC BASE COMPOSITE, PRODUCTION METHOD THEREFOR, AND POLYMER MEMBER THEREFOR

CROSS REFERENCE TO RELATED APPLICATIONS

This application is a Divisional of application Ser. No. 17/435,893 filed Sep. 2, 2021, which is a National Stage of International Application No. PCT/JP2020/009831 filed Mar. 6, 2020, claiming priority based on Japanese Patent Application No. 2019-043196 filed Mar. 8, 2019 and Japanese Patent Application No. 2019-219698 filed Dec. 4, 2019. The disclosure of U.S. application Ser. No. 17/435,893 is incorporated by reference herein in its entirety.

FIELD

The present invention relates to a composite of polymer member and inorganic substrate, a method of manufacturing the same, and a polymer member therefor.

BACKGROUND OF THE INVENTION

A polymer member, for example a polyolefin-based polymer such as polypropylene, polyethylene, and cyclic olefin, has been widely used in molded articles such as resin films, nonwoven fabrics, automotive parts, electronic equipment parts, and camera lenses because of their excellent lightness, mechanical strength, chemical resistance, and the like. In contrast, inorganic materials such as metals, semiconductors, or oxides thereof have different mechanical, thermal, optical, and chemical properties than the polymer member. Accordingly, it has been studied to bond the polymer member to the inorganic substrate in order to utilize their different properties in a preferable manner.

In this regard, for example, in Patent Document 1, an inorganic material and a polyolefin-based resin material are integrated without using an adhesive to provide a composite material useful for a microchip, a liquid crystal protective film for TV, and the like. Specifically, this Patent Document 1 proposes a method for producing a composite material comprising an inorganic material and a polyolefin-based resin material, in which a thin film having a thickness of 1 to 50 nm consisting of an organic material with a hydrophilic group is formed on a surface of an inorganic material, and the inorganic material on which the thin film has been formed and a polyolefin-based resin material are irradiated with ultraviolet rays having a wavelength of 100 to 200 nm, respectively, and then the polyolefin-based resin material is laminated on the thin film of the inorganic material to integrate the inorganic material and the polyolefin-based resin material.

RELATED ART

Patent Literature

[Patent Document 1] JP-A-2013-103456

SUMMARY OF THE INVENTION

Problems to be Solved by the Invention

As described above, it may be preferable to bond a polymer member to an inorganic substrate without using an adhesive. Accordingly, in the present invention, there is provided a method useful for bonding a polymer member to an inorganic substrate without using an adhesive, as well as a polymer member or the like used therefor.

Solution to the Problem

The present invention may include the following embodiments.

Embodiment 1

A method for manufacturing a composite of polymer member and inorganic substrate, comprising:
   providing a composite of thermally modified polymer layer and inorganic substrate in which one or more thermally modified polymer layers are adhered onto an inorganic substrate, and
   bonding a polymer member to the inorganic substrate via the one or more thermally modified polymer layers,
wherein the polymer member at least comprises inorganic particles and a polymer.

Embodiment 2

The method according to embodiment 1, wherein the polymer member further comprises a coupling agent.

Embodiment 3

The method according to embodiment 1 or 2, wherein the polymer member is in the form of a membrane or film.

Embodiment 4

The method according to any one of embodiments 1 to 3, wherein the bonding of the polymer member is performed by thermocompression bonding.

Embodiment 5

The method according to any one of embodiments 1 to 4, wherein the one or more thermally modified polymer layers are formed of an olefin polymer, and the polymer of the polymer member is an olefin polymer.

Embodiment 6

The method according to embodiment 5, wherein the olefin polymer is a cyclic olefin polymer.

Embodiment 7

The method according to any one of embodiments 1 to 6, wherein the inorganic substrate is selected from a group consisting of metals and metalloids, metal oxides and metalloid oxides, metal nitrides and metalloid nitrides, metal carbides and metalloid carbides, carbon materials, and combinations thereof.

Embodiment 8

A composite of polymer member and inorganic substrate, comprising:
   an inorganic substrate,
   one or more thermally modified polymer layers adhered to the inorganic substrate, and a polymer member adhered to the inorganic substrate via the one or more thermally modified polymer layers wherein the polymer member at least comprises inorganic particles and a polymer.

Embodiment 9

The composite according to embodiment 8, wherein the polymer member further comprises a coupling agent.

Embodiment 10

The composite according to embodiment 8 or 9, wherein the polymer member is in the form of a membrane or film.

Embodiment 11

The composite according to any one of embodiments 8 to 10, wherein the one or more thermally modified polymer layers are formed of an olefin polymer, and the polymer of the polymer member is an olefin polymer.

Embodiment 12

The composite according to embodiment 11, wherein the olefin polymer is a cyclic olefin polymer.

Embodiment 13

A polymer member at least comprising inorganic particles, a polymer, and a coupling agent.

Embodiment 14

The polymer member according to embodiment 13, which is in the form of a membrane or film.

Embodiment 15

The polymer member according to embodiment 13 or 14, wherein the average primary particle diameter of the inorganic particles is from 1 to 500 nm.

Embodiment 16

A composite polymer member, comprising:
a polymer member at least comprising inorganic particles and a polymer; and an additional polymer member at least comprising a polymer.

Embodiment 17

The composite polymer member according to embodiment 16, which is in the form of a membrane or film.

Embodiment 18

The composite polymer member according to embodiment 16 or 17, wherein the inorganic particles have the average primary particle diameter of 1 to 500 nm.

Embodiment 19

The composite polymer member according to any one of embodiments 16 to 18, wherein at least one of the polymer member and the additional polymer member further comprises a coupling agent.

Embodiment 20

The composite polymer member according to embodiment 19, wherein the polymer member is in the form of a film and further comprises a coupling agent, the additional polymer member is in the form of a film, further comprises inorganic particles, and does not comprise a coupling agent, and the composite polymer member is in the form of a film.

Embodiment 21

The polymer member according to any one of embodiments 13 to 15 and the composite polymer member according to any one of embodiments 16 to 20, which are for optical use.

Advantageous Effects of Invention

According to the present disclosure, it is possible to provide a method which is beneficial for bonding a polymer member to an inorganic substrate without using an adhesive, and a polymer member or the like used therefor.

DETAILED DESCRIPTION OF THE EMBODIMENTS

Figure 1A:
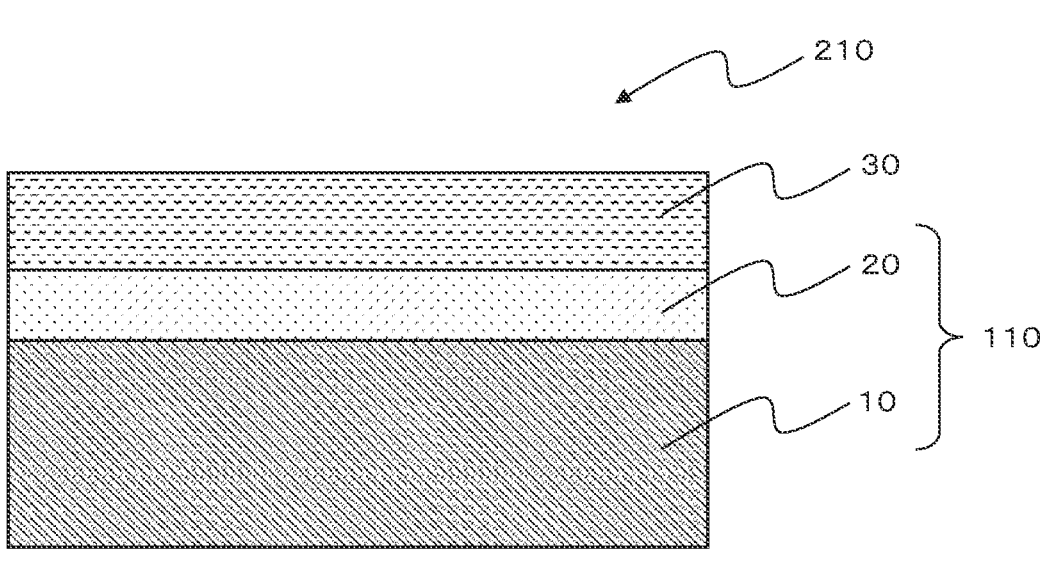
FIG. 1A is a schematic cross-sectional view of a composite of polymer member and inorganic substrate according to the present invention.

<<Method for Manufacturing a Composite of Polymer Member and Inorganic Substrate>>

The method for manufacturing a composite of polymer member and inorganic substrate according to the present invention comprises:

providing a composite of thermally modified polymer layer and inorganic substrate, in which one or more thermally modified polymer layers are adhered onto an inorganic substrate, and bonding a polymer member to the inorganic substrate via the one or more thermally modified polymer layers.

Without wishing to be bound by theory, it is believed that according to the method of the present invention for manufacturing a composite of polymer member and inorganic substrate, by bonding the polymer member to the inorganic substrate via the one or more thermally modified polymer layers, it is possible to improve the adhesion of the polymer member to the inorganic substrate. With respect to the bonding of the polymer member and the inorganic substrate via the one or more thermally modified polymer layers, the polymer member can be bonded directly to the one or more thermally modified polymer layers, or to a thermally unmodified polymer layer on the one or more thermally modified polymer layers.

A method for manufacturing a composite of thermally modified polymer layer and inorganic substrate in which one or more thermally modified polymer layers are adhered onto an inorganic substrate may include forming a first polymer layer on an inorganic substrate and then heating the first polymer layer to form a first thermally modified polymer layer, in order to adhere the first thermally modified polymer layer onto the inorganic substrate.

Note that, in the composite of polymer member and inorganic substrate according to the present invention, the polymer member at least comprises inorganic particles and a polymer, and in particular at least comprises inorganic particles and a cyclic olefin polymer.

When the polymer member comprises inorganic particles, it is possible to adjust the physical properties, such as the refractive index, of the polymer member.

In a preferred embodiment of the composite of polymer member and inorganic substrate according to the present disclosure, the polymer member at least comprises inorganic particles, a polymer, and a coupling agent, and in particular at least comprises inorganic particles, a cyclic olefin polymer, and a silane coupling agent.

When the polymer member further comprises the coupling agent, the adhesion of the polymer member to the thermally modified polymer layer can be further improved. In particular, the adhesion of the polymer member to the thermally modified polymer layer can be further improved, when the adhesion of the polymer member to the thermally modified polymer layer is reduced due to the inclusion of the inorganic particles.

Without wishing to be bound by theory, it is believed that this is because the coupling agent, in particular the coupling agent adhered to the surface of the inorganic particles, improves the dispersibility of the inorganic particles in the polymer member, and the remaining coupling agent improves the adhesion of the polymer member to the thermally modified polymer layer.

<Inorganic Substrate>

The inorganic substrate used in the method of the present invention may be any inorganic substrate, and may be selected from the group consisting of, for example, metals and metalloids, oxides of metals and metalloids, nitrides of metals and metalloids, carbides of metals and metalloids, carbon materials, and combinations thereof. Specifically, examples of the metal include aluminum, magnesium, titanium, nickel, chromium, iron, copper, gold, silver, tungsten, zirconium, yttrium, indium, iridium, and the like, and examples of the metalloid include silicon, germanium, GaAs, InGaAs, InAlAs, LiTaOx, NbTaOx, ZnTe, GaSe, GaP, CdTe, diamond, diamond-like carbon, and the like. Therefore, examples of the metal oxide include oxides of these metals, and examples of the metalloid oxide include oxides of these metalloids and the like. Examples of an oxide of silicon includes glass such as quartz glass and soda glass, and examples of an oxide of aluminum include sapphire and the like. The nitride may include aluminum nitride, silicon nitride, and the like. The carbide include silicon carbide. Further, the carbon material includes diamond and the like.

The surface of the inorganic substrate, in particular the metal or the metalloid, may be subjected to a treatment such as ozonation, ultraviolet treatment, or the like, in order to increase a functional group, e.g., a hydroxyl group, which can be utilized for the bonding with the first thermally modified polymer layer.

From the viewpoint of stably forming the thermally modified olefin polymer layer on the inorganic substrate, an inorganic material having a melting point higher than the thermal modification temperature (thermal denaturation temperature) of the thermally modified polymer layer can be preferably used.

The inorganic substrate may be in any form, and may be, for example, in the form of a film, a sheet, a plate, a tube, a rod, a disk, or the like. In addition, the inorganic substrate may be of any size.

<Thermally Modified Polymer Layer>

A first polymer layer may be formed on an inorganic substrate, and then the first polymer layer may be heated to form a first thermally modified polymer layer, in order to adhere the first thermally modified polymer layer onto the inorganic substrate.

After the formation of the first thermally modified polymer layer, a second polymer layer may be formed on the first thermally modified polymer layer, and then the second polymer layer may be heated to form a second thermally modified polymer layer, in order to adhere the second thermally modified polymer layer onto the first thermally modified polymer layer.

When the second thermally modified polymer layer is used, the degree of thermal modification of the second thermally modified polymer layer may be less than the degree of thermal modification of the first thermally modified polymer layer, so that the first thermally modified polymer layer provides good bonding to the inorganic substrate and the second thermally modified polymer layer provides good bonding to the first thermally modified polymer layer and the polymer member.

Further, in the method of the present invention, after forming the second thermally modified polymer layer, a third polymer layer may be formed on the second thermally modified polymer layer, and then the third polymer layer may be heated to form a third thermally modified polymer layer, in order to adhere the third thermally modified polymer layer onto the second thermally modified polymer layer.

When the third thermally modified polymer layer is used, the degree of thermal modification of the third thermally modified polymer layer may be less than the degree of thermal modification of the second thermally modified polymer layer, so that the second thermally modified polymer layer provides good bonding to the first thermally modified polymer layer and the third thermally modified polymer layer provides good bonding to the second thermally modified polymer layer and the polymer member.

Further, additional thermally modified polymer layers such as a fourth thermally modified polymer layer, a fifth thermally modified polymer layer, or the like, can be used in the same manner.

The degree of thermal modification of these thermally modified polymer layers can be adjusted by the temperature, time, ambient atmosphere, and the like of the heating for thermal modification.

Specifically, for example, the degree of thermal modification of the first thermally modified polymer layer may be such that the first thermally modified polymer layer adheres onto the inorganic substrate, i.e., such that the adhesion of the first thermally modified polymer layer to the inorganic substrate is greater than the adhesion of the thermally unmodified first polymer layer to the inorganic substrate.

Similarly, the degree of thermal modification of the second thermally modified polymer layer may be such that the second thermally modified polymer layer adheres onto the first thermally modified polymer layer, i.e., such that the adhesion of the second thermally modified polymer layer to the first thermally modified polymer layer is greater than the adhesion of the thermally unmodified second polymer layer to the first thermally modified polymer layer.

Similarly, the degree of thermal modification of the third thermally modified polymer layer may be such that the third thermally modified polymer layer adheres to the second thermally modified polymer layer, i.e., such that the adhesion of the third thermally modified polymer layer to the second thermally modified polymer layer is greater than the adhesion of the thermally unmodified third polymer layer to the second thermally modified polymer layer.

The degree of thermal modification of these thermally modified polymer layers can be adjusted, for example, by the heating temperature, the oxygen concentration in an atmosphere for heating, and the like, for the thermal modification of the thermally modified polymer layer. In other words, in order to increase the degree of thermal modification, the heating temperature can be increased and/or the oxygen concentration in the atmosphere for heating can be increased. On the contrary, in order to decrease the degree of thermal modification, the heating temperature can be decreased, and/or the oxygen concentration in the atmosphere for heating can be decreased.

The heating temperature for thermal modification of the thermally modified polymer layer may be 50° C. or more, 100° C. or more, 140° C. or more, 160° C. or more, 180° C. or more, or 200° C. or more, and may be 500° C. or less, 400° C. or less, 360° C. or less, 320° C. or less, or 280° C. or less. Further, this heating can be performed in an oxygen-containing atmosphere, in particular in air.

The degree of thermal modification of these thermally modified polymer layers can be evaluated, for example, using the oxygen content of the thermally modified polymer constituting the thermally modified polymer layer, specifically, the ratio of the number of oxygen atoms contained in the thermally modified polymer layer to the total number of oxygen atoms and carbon atoms contained in the thermally modified polymer layer (number of oxygen atoms/(number of oxygen atoms+number of carbon atoms)×100(%)). In this case, it is considered that the larger the ratio, the larger the degree of thermal modification. A method for evaluating the content of oxygen atoms and carbon atoms of the thermally modified polymer layer includes, for example, X-ray photoelectron spectroscopy (XPS). An XPS device for this purpose includes a K-Alpha (Thermo Fisher Scientific).

When such a ratio (number of oxygen atoms/(number of oxygen atoms+number of carbon atoms)×100(%)) is 0.3% or more, 0.5% or more, 1.0% or more, 2.0% or more, or 5.0% or more, and 50% or less, 30% or less, 20% or less, 10% or less, or 8% or less, it is particularly appropriate to use this ratio as an index indicating the degree of thermal modification of the thermally modified polymer layer.

When evaluating the degree of thermal modification using the above ratio (number of oxygen atoms/(number of oxygen atoms+number of carbon atoms)×100(%)), the difference in this ratio between neighboring thermally modified polymer layers, such as the difference between the ratio of the first thermally modified polymer layer and the ratio of the second thermally modified polymer layer, may be 0.1% or more, 0.2% or more, 0.3% or more, 0.4% or more, 0.5% or more, 0.8% or more, 1.0% or more, 2.0% or more, or 3.0% or more, and may be 10.0% or less, 7.0% or less, 5.0% or less, 3.0% or less, 2.0% or less, 1.0% or less, 0.5% or less, 0.3% or less or 0.1% or less.

In other words, for example, the ratio of the number of oxygen atoms contained in the second thermally modified polymer layer to the total number of oxygen atoms and carbon atoms contained in the second thermally modified polymer layer (i.e., the ratio of the number of oxygen atoms/(the number of oxygen atoms+the number of carbon atoms)×100(%) for the second thermally modified polymer layer) may be 0.1% or more and 10.0% or less smaller than the ratio of the number of oxygen atoms contained in the first thermally modified polymer layer to the total number of oxygen atoms and carbon atoms contained in the first thermally modified polymer layer (i.e., the ratio of the number of oxygen atoms/(the number of oxygen atoms+the number of carbon atoms)×100(%) for the first thermally modified polymer layer)

Further, the degree of thermal modification of these thermally modified polymer layers can be evaluated, for example, by IR absorption spectrum of the thermally modified polymer constituting the thermally modified polymer layer. An IR absorption analyzer for this purpose includes Nicolet 6700 (Thermo Fisher SCIENTIFIC). Specifically, the degree of thermal modification of the thermally modified polymer layer can be evaluated by the ratio of the intensity of the absorption peak of the C=O stretching vibration to the intensity of the absorption peak of the C—H stretching vibration (a ratio of the intensity of the absorption peak of C=O stretching vibration/intensity of the absorption peak of C—H stretching vibration (—)). In this case, it is considered that the larger the ratio, the larger the degree of thermal modification. The intensity of the absorption peak can be determined by reading the maximum value of the absorbance value of the absorption peak.

When such a ratio (a ratio of intensity of absorption peak of C=O stretching vibration/intensity of absorption peak of C—H stretching vibration (—)) is 0.01 or more, 0.02 or more, 0.05 or more, 0.1 or more, 0.15 or more, or 0.20 or more, and 20 or less, 10 or less, or 5 or less, it is particularly appropriate to use the ratio as an index indicating the degree of thermal modification of the thermally modified polymer layer.

When the degree of thermal modification is evaluated using the above-described ratio (a ratio of intensity of absorption peak of C=O stretching vibration/intensity of absorption peak of C—H stretching vibration (—)), the difference in this ratio between neighboring thermally modified polymer layers, such as the difference between the ratio of the first thermally modified polymer layer and the ratio of the second thermally modified polymer layer, may be 0.1 or more, 0.2 or more, 0.3 or more, 0.4 or more, 0.5 or more, 0.8 or more, 1.0 or more, 2.0 or more, or 3.0 or more, and may be 10.0 or less, 7.0 or less, 5.0 or less, 3.0 or less, 2.0 or less, 1.0 or less, 0.5 or less, 0.3 or less, or 0.1 or less.

In other words, for example, the ratio of the intensity of the absorption peak of the C=O stretching vibration of the second thermally modified polymer layer to the intensity of the absorption peak of the C—H stretching vibration of the second thermally modified polymer layer (i.e., the ratio of the intensity of the absorption peak of the C=O stretching vibration/the intensity of the absorption peak of the C—H stretching vibration (—) for the second thermally modified polymer layer) may be 0.1 or more and 20.0 or less smaller than the ratio of the intensity of the absorption peak of the C=O stretching vibration of the first thermally modified polymer layer to the intensity of the absorption peak of the C—H stretching vibration of the first thermally modified polymer layer (i.e., the ratio of the intensity of the absorption peak of the C=O stretching vibration/the intensity of the absorption peak of the C—H stretching vibration (—) for the first thermally modified polymer layer).

A method for the heating is not particularly limited. The method for the heating may include a method using a heating source such as an oven, a hot plate, infrared rays, a flame, a laser, or a flash lamp.

Note that the formation of the polymer layer such as the first polymer layer can be performed by coating and/or thermocompression bonding.

When the formation of the polymer layer is carried out by coating, a polymer constituting the polymer layer may be dissolved in a solvent to form a solution, a coating may be carried out with this solution, and then the coated solution may be dried to form a polymer layer. A coating method in this case may include methods using a solution, such as a spin coating method, a roll coater method, a spray coating method, a die coater method, an applicator method, an immersion coating method, a brush coating, a spatula coating, a roller coating, a curtain flow coater method and the like.

When the polymer layer such as the first polymer layer is formed by a method using a solution, the method may include a step of removing the solvent by heating after the coating of the solution. In this case, as the heating condition, it is possible to select temperature, heating time and atmospheric pressure condition which are sufficient to remove the solvent from the coating film.

Further, when the coating layer is formed by thermocompression bonding, it is possible to use a method of melting or welding a bulk solid, a powder, a film or the like while optionally applying pressure, such as a hot press method, a welding method, a powder coating method, or the like.

Note that the thickness of the polymer layer such as the first polymer layer may have any thickness, and may have a thickness which ensures that a thermally modified polymer layer to be obtained provides good bonding between the inorganic substrate and the polymer member. The thickness may be, for example, 1 nm or more, 5 nm or more, or 10 nm or more, and may be 100 μm or less, 30 μm or less, or 10 μm or less, or even 1000 nm or less, 500 nm or less, or 100 nm or less.

As described above, the thermally modified polymer layer is a layer via which the polymer member is bonded to the inorganic substrate. Therefore, this thermally modified polymer layer is preferably composed of the same type of polymer as the polymer constituting the polymer member, in order to promote the bonding between the thermally modified polymer layer and the polymer member.

Thus, the polymer layer such as the first polymer layer may be formed of an olefin polymer, for example, a cyclic olefin polymer.

Note that the olefin polymer means a polymer obtained by polymerizing monomers containing an olefin as the main component; in other words, the olefin polymer means a polymer obtained by polymerizing monomers containing 50% by mass or more, 60% by mass or more, 70% by mass or more, 80% by mass or more, 90% by mass or more, or 95% by mass or more of a monomer portion derived from an olefin. Examples of the olefin polymer include polyethylene, polypropylene, polybutene, polymethylpentene, copolymers of α-olefin and ethylene or propylene such as propylene-ethylene copolymer and propylene-butene copolymer, styrene-butadiene-styrene block copolymer, styrene-hexadiene-styrene copolymer, styrene-pentadiene-styrene copolymer, ethylene-propylene-diene copolymer (RPDM), cyclic olefin polymer, and the like. However, the present invention is not limited to these examples. These olefin polymers may be used alone, or two or more thereof may be used in combination.

Among these olefin polymers, mention may be made, in particular, of cyclic olefin polymers.

The cyclic olefin polymer is a polymer having a cyclic olefin portion in the polymer main chain. Examples of such a cyclic olefin polymer include a ring-opening polymer of a cyclic olefin monomer, an addition polymer of a cyclic olefin monomer, a copolymer of a cyclic olefin monomer and a linear olefin, and the like. However, the present invention is not limited to these examples.

The cyclic olefin monomer is a compound having a ring structure formed of carbon atoms and having a carbon-carbon double bond in the ring structure. Examples of the cyclic olefin monomer include a norbornene-based monomer containing a nobornene ring, such as 2-norbornene, norbornadiene and other bicyclic compounds, dicyclopentadiene, dihydrodicyclopentadiene and other tricyclic compounds, a tetracyclododecene, ethylidene-tetracyclododecene, phenyl-tetracyclododecene and other tetracyclic compounds, tricyclopentadiene and other five-membered ring compounds, tetracyclopentadiene and other seven-membered ring compounds; and a monocyclic cyclic olefin such as cyclobutene, cyclopentene, cyclooctene, cyclododecene, and 1,5-cyclooctadiene. However, the present invention is not limited to these examples. The cyclic olefin monomer may have substituent(s) within a range in which the object of the present invention is not inhibited.

Cyclic olefin polymers are readily available commercially, for example, ZEONEX (trade name) Series and ZEONOR (trade name) Series, etc., from Zeon Corporation; SUMILITE (trade name) Series from Sumitomo Bakelite Co., LTD.; ARTON (trade name) Series from JSR Corporation; APEL Series, Mitsui Chemicals Inc.; TOPAS (trade name) from Ticona; Optolets Series, etc., from Hitachi Chemical Co., LTD.

When the polymer member is bonded to a thermally unmodified polymer layer situated on one or more thermally modified polymer layers, the thermally unmodified polymer layer is preferably the same type of polymer as the thermally modified polymer layer such as the first thermally modified polymer layer and the polymer member. For example, the thermally modified polymer layer such as the first thermally modified polymer layer, the thermally unmodified polymer layer and the polymer member may all be formed of an olefin polymer such as a cyclic olefin polymer. As for the specific materials and methods for the formation of the polymer member, reference may be made to the above description regarding the thermally modified polymer layers such as the first thermally modified polymer layer.

<Polymer Member>

In the method of the present invention, the polymer member may be a member of any shape, and may be, for example, in the form of a membrane or film. In this case, the bonding of the polymer member may be carried out by coating or thermocompression bonding, in particular by thermocompression bonding. The polymer member at least comprises inorganic particles and a polymer, and particularly preferably at least comprises inorganic particles and a cyclic olefin polymer.

When the polymer member is in the form of a membrane or a film, the thickness thereof is preferably 1 cm or less, 5 mm or less, 2 mm or less, 1 mm or less, 500 μm or less, 200 μm or less, 100 μm or less, or 50 μm or less, and 1 μm or more, 2 μm or more, 5 μm or more, 10 μm or more, or 15 μm or more.

The polymer member preferably further comprises a coupling agent, in particular a silane coupling agent.

Such a polymer member may be an optical member, in particular an anti-reflection film. The polymer member may consist of a plurality of portions, and in particular, the polymer member may be a composite film which is a laminate of a plurality of layers.

When the polymer member is a composite film which is a laminate of a plurality of layers, the number of layers of the laminate is preferably 2 or more, and preferably 500 or less, 100 or less, 80 or less, 60 or less, 40 or less, 30 or less, 20 or less, 10 or less, or 5 or less.

The thermally modified polymer layer such as the first thermally modified polymer layer and the polymer member are preferably the same type of polymer. For example, the thermally modified polymer layer such as the first thermally modified polymer layer and the polymer member may be formed of an olefin polymer such as a cyclic olefin polymer. As for the specific polymers and methods for the formation of the polymer member, reference may be made to the above description regarding the thermally modified polymer layers such as the first thermally modified polymer layers.

(Inorganic Particle)

The inorganic particles in the present invention may include any inorganic particles which can be dispersed in the polymer member, and examples of such inorganic particles include particles of metal or metalloid, particles of an oxide or fluoride of metal or metalloid, and particles of compounds containing metal or metalloid.

As the metal or the metalloid, at least one selected from the group consisting of Si, Ge, Al, Mg, Ti, Ni, Cr, Fe, Cu, Au, Ag, W, Zr, Y, In, and Jr may be preferably used, and Si and Ge may be particularly preferably used. Further, as the oxide and the fluoride of the metal or the metalloid, at least one selected from the group consisting of $MgO$, $Al_2O_3$, $Bi_2O_3$, $CaF_2$, $In_2O_3$, $In_2O_3 \cdot SnO_2$, $HfO_2$, $La_2O_3$, $MgF_2$, $Sb_2O_5$, $Sb_2O_5 \cdot SnO_2$, $SiO_2$, $SnO_2$, $TiO_2$, $Y_2O_3$, $ZnO$ and $ZrO_2$ may be preferably used, and $MgO$, $Al_2O_3$, $SiO_2$, $TiO_2$ may be particularly preferably used. Further, the compound containing the metal or the metalloid includes GaAs, InGaAs, InAlAs, LiTaOx, NbTaOx, ZnTe, GaSe, GaP, CdTe, diamond, diamond-like carbon, SiC, and the like.

When the inorganic particles are silicon particles, the inorganic particles may be silicon particles obtained by a laser pyrolysis method, in particular, a laser pyrolysis method using a $CO_2$ laser.

The above inorganic particles, particularly the silicon particles, may contain impurity elements such that the concentration of each impurity element is 1000 ppm or less, 500 ppm or less, 300 ppm or less, 100 ppm or less, 50 ppm or less, 10 ppm or less, or 1 ppm or less, in order to obtain good optical properties. When the inorganic particles described above are silicon particles, examples of such impurities include elements in Group 13 and Group 15.

Preferably, the average primary particle diameter of the inorganic particles is 1 nm or more, or 3 nm or more, and 10000 nm or less, 5000 nm or less, 2000 nm or less, 1000 nm or less, 500 nm or less, 200 nm or less, 100 nm or less, 50 nm or less, 30 nm or less, 20 nm or less, or 10 nm or less.

In the present invention, the average primary particle diameter of the particles may be obtained as the number average primary particle diameter, by taking images of the particles with a scanning electron microscope (SEM), a transmission electron microscope (TEM) or the like, by measuring the particle diameter directly based on the images, and by analyzing a group of particles of 100 or more.

When the particle diameter is too large, scattering tends to occur, which may not be preferable. When the particle diameter of the particles is too small, activation of the particle surface is facilitated due to an increase in the specific surface area of the particles, causing a remarkably high cohesiveness between the particles, and resulting in poor handleability, which may not be preferable.

The content ratio of the inorganic particles may be, for example, such that the volume ratio of the polymer to the inorganic particles is 1:99 to 99:1, 5:95 to 95:5, 10:90 to 85:15, 20:80 to 80:20, 30:70 to 75:25, or 40:60 to 70:30. When the content of the inorganic particle is too low, the degree of adjustment of the refractive index and the like of the polymer member may be reduced, and when the content of the inorganic particles is too high, the strength and the like as the polymer member may not be maintained. When the polymer member is composed of a plurality of portions as described above, it is preferable that a portion of the polymer member to be bonded to a composite of thermally modified polymer layer and inorganic substrate satisfies the above-described volume ratio of the polymer and the inorganic particles. Thus, for example, when the polymer member is a composite film which is a laminate of a plurality of layers, it is preferable that a layer of the composite film to be bonded to a composite of thermally modified polymer layer and inorganic substrate satisfies the above-described volume ratio of the polymer and the inorganic particles.

As the coupling agent in the present invention, any coupling agent which can be combined with the inorganic particles may be used. Specifically, as the coupling agent, a silane coupling agent, a titanate coupling agent, or an aluminate coupling agent may be used, and in particular, a silane coupling agent may be used. When an olefin polymer such as a cyclic olefin polymer is used as a polymer of the polymer member, it is possible to use a coupling agent with a functional group exhibiting good miscibility to these polymers, for example, a coupling agent with an alkyl chain, a cyclohexyl group, or a benzene ring, and more specifically, a coupling agent with an alkyl chain having 1 to 30, 1 to 25, or 1 to 20 carbon atoms, a cyclohexyl group, or a benzene ring. The coupling agent and/or a hydrolytic condensate of the coupling agent may be used alone or in combination of two or more.

Specifically, the coupling agent includes octadecyltriethoxysilane (OTS), octyltriethoxysilane, triethoxyphenylsilane, 3-phenylpropyltriethoxysilane, cyclohexyltrimethoxysilane, octadecyltrimethoxysilane, octadecyltrichlorosilane, 3-aminopropyltrimethoxysilane, 3-aminopropyltriethoxysilane, γ-(2-aminoethyl)aminopropyltrimethoxysilane, γ-(2-aminoethyl)aminopropyltriethoxysilane, γ-(2-aminoethyl)aminopropylmethyldimethoxysilane, γ-(2-aminoethyl)aminopropylmethyldiethoxysilane, γ-methacryloxypropyltrimethoxysilane, γ-methacryloxypropyltriethoxysilane, N-β-(N-vinylbenzylaminoethyl)-γ-aminopropyltrimethoxysilane hydrochloride, N-β-(N-vinylbenzylaminoethyl)-γ-aminopropyltriethoxysilane hydrochloride, γ-glycidoxypropyltrimethoxysilane, γ-glycidoxypropyltriethoxysilane, γ-mercaptopropyltrimethoxysilane, γ-mercaptopropyltriethoxysilane, vinyltriacetoxysilane, γ-anilinopropyltrimethoxysilane, γ-anilinopropyltriethoxysilane, vinyltrimethoxysilane, vinyltriethoxysilane, octadecyldimethyl[3-(trimethoxysilyl) propyl]ammonium chloride, octadecyldimethyl[3-(triethoxysilyl)propyl]ammonium chloride, γ-ureidopropyltrimethoxysilane, γ-ureidopropyltriethoxysilane, 3-isocyanatopropyltrimethoxysilane, and 3-isocyanatopropyltriethoxysilane.

The content ratio of the coupling agent may be, for example, such that the mass ratio of the inorganic particles to the coupling agent is 1:99 to 99:1, 5:95 to 95:5, 10:90 to 90:10, 20:80 to 80:20, 30:70 to 70:30, or 40:60 to 60:40. When the content of the coupling agent is too low, the adhesion between the polymer member and the thermally modified polymer layer may be insufficient, and when the content of the coupling agent is too high, strength and the like as the polymer member may not be maintained.

<<Composite of Polymer Member and Inorganic Substrate>>

In the composite of thermally modified polymer layer and inorganic substrate which can be used for the manufacturing of the composite of polymer member and inorganic substrate of the present invention, the one or more thermally modified polymer layers are adhered to the inorganic substrate. In addition, in the composite of polymer member and inorganic substrate of the present invention, the polymer member is adhered to the inorganic substrate via the one or more thermally modified polymer layers of the composite of thermally modified polymer layer and inorganic substrate of the present invention.

Figure 1B:
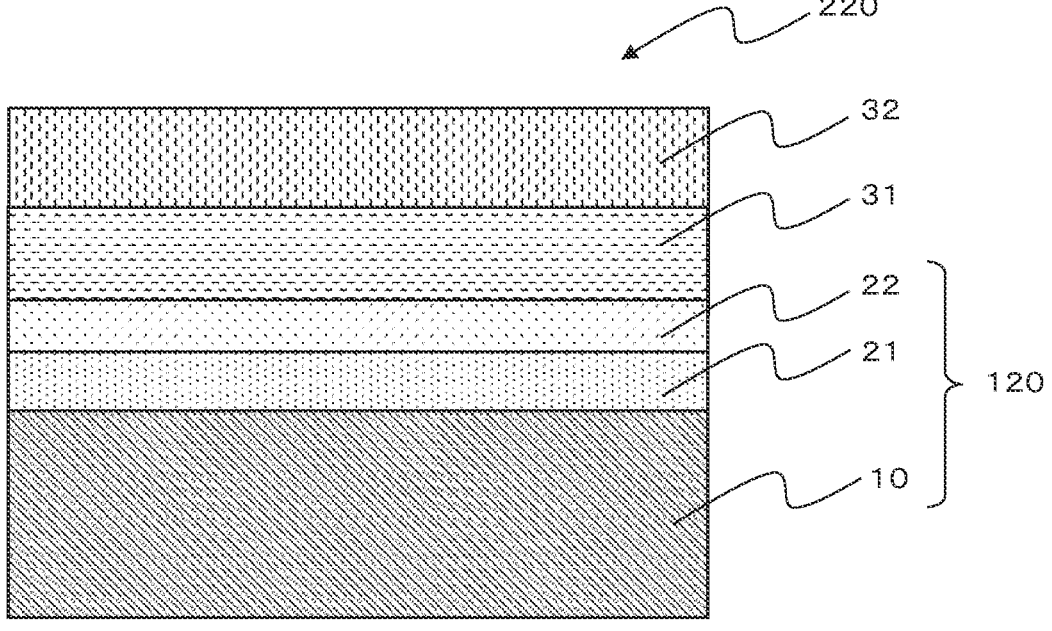
FIG. 1B is a schematic cross-sectional view of a composite of polymer member and inorganic substrate according to the present invention.

Specifically, as shown in FIG. 1A and FIG. 1B, in the composites of polymer member and inorganic substrate 210, 220 of the present invention, the polymer members 30, 31, 32 are bonded to the inorganic substrate 10 via the one or more thermally modified polymer layers 20, 21, 22 of the composites of thermally modified polymer layer and inorganic substrate 110, 120.

According to the composite of polymer member and inorganic substrate of the present invention described above, it is possible to improve the adhesion of the polymer member to the inorganic substrate.

For details of each component of the composite of thermally modified polymer layer and inorganic substrate of the present invention and the composite of polymer member and inorganic substrate of the present invention, reference may be made to the description relating to the method of the present invention.

<<Composite Polymer Member>>

The polymer member according to the present disclosure may form a composite polymer member together with an additional polymer member at least comprising a polymer.

With respect to the additional polymer member, reference may be made to the description relating to the polymer member, except that the additional polymer member may not contain inorganic particles.

EXAMPLES

Examples 1 to 9 and Comparative Example 1

In Examples 1 to 9, a laminate was formed which has, on a silicon substrate 10, first and second thermally modified polymer layers 21, 22 and first and second anti-reflection layers 31, 32 as polymer members in this order, as shown in FIG. 1B. For this laminate, the adhesion of the anti-reflection composite film composed of the first and second anti-reflection layers to the silicon substrate was evaluated.

In Comparative Example 1, a laminate was formed which has, on a silicon substrate, first and second anti-reflection layers as polymer members in this order. For this laminate, the adhesion of the anti-reflection composite film composed of the first and second anti-reflection layers to the silicon substrate was evaluated.

Incidentally, in Examples 1 to 9 and Comparative Example 1, a cyclic olefin polymer (COP) (ZEONEX™ 480R; from Zeon Corporation; glass transition temperature of 138° C.) was used as a material for both the thermally modified polymer layer and the polymer member.

Example 1

(1) Preparation of COP Solution A

A COP solution A was obtained by mixing and stirring 7% by mass of COP and 93% by mass of toluene at room temperature.

(2) Preparation of the Anti-Reflection Composite Film with the First and Second Anti-Reflection Films (a) Preparation of COP Solution B1 (Containing No Silicon Particles)

A COP solution B1 was obtained by mixing and stirring 35% by mass of COP and 65% by mass of toluene at room temperature (b) Preparation of COP Solution B2 (Containing OTS-Treated Silicon Particles)

(b-1) Fabrication of Silicon Particles

Silicon particles were prepared by laser pyrolysis (LP) method using carbon dioxide laser, using monosilane gas as a raw material. Further, the metal impurity content of the obtained silicon particles was measured using an inductively coupled plasma mass spectrometer (ICP-MS). As a result, the content of Fe was 15 ppb, the content of Cu was 18 ppb, the content of Ni was 10 ppb, the content of Cr was 21 ppb, the content of Co was 13 ppb, the content of Na was 20 ppb, and the content of Ca was 10 ppb. The average primary particle diameter of the inorganic particles was 100 nm.

(b-2) Surface Treatment of Silicon Particles

Silicon particles and octadecyltriethoxysilane (OTS) were placed in a sealed container in an amount such that a ratio of silicon particles and OTS was 1:1 (mass ratio), and then, after mixing, heated to 120° C. and held for 3 hours, to obtain OTS-treated silicon particles.

(b-3) Preparation of COP Solution B2

A COP solution was obtained by mixing and stirring 10% by mass of COP and 90% by mass of toluene at room temperature. To this COP solution, the OTS-treated silicon particles were added and mixed such that the volume ratio of the COP and the silicon particles was 65:35. Further, by homogenzing this mixture in a homogenizer for 15 minutes, a COP solution B2 containing the OTS-treated silicon particles was prepared.

(c) Preparation of Anti-Reflection Composite Films (c-1) Formation of Second Anti-Reflection Layer The COP solution B1 obtained as described above was coated on a glass substrate using a doctor blade to obtain a coating film, and the solvent in the coating film was removed by heating at 110° C., in order to obtain a second anti-reflection layer having a thickness of 25 μm on the glass plate.

(c-2) Formation of First Anti-Reflection Layer

The COP solution B2 obtained as described above was coated on the second anti-reflection layer using a doctor blade to obtain a coating film, and the solvent in the coating film was removed by heating at 110° C., in order to form a first anti-reflection layer having a thickness of 20 μm on the second anti-reflection layer having a thickness of 25 μm.

(c-3) Peeling of Anti-Reflection Composite Film

The first and second anti-reflection layers obtained as described above were peeled off from the glass plate to obtain an anti-reflection composite film (a composite polymer member) having the first and second anti-reflection layers.

(3) Formation of First Thermally Modified Polymer Layer

A silicon substrate was used as an inorganic substrate, and a COP solution A was spin-coated on the silicon substrate. The spin coating was performed by maintaining the rotation speed at 2000 rpm for 20 seconds.

Thereafter, the silicon substrate coated with the COP solution A in this manner was held on a hot plate heated to 120° C. and dried to obtain a silicon substrate having a first polymer layer. Thereafter, the first polymer layer was thermally modified (thermally denatured) by holding the substrate on a hot plate heated to 280° C. over a period of 1 minutes, in order to form a first thermally modified polymer layer having a film thickness of 23 nm, which was adhered to the silicon substrate.

(4) Formation of Second Thermally Modified Polymer Layer

A COP solution A was spin-coated on the first thermally modified polymer layer of the silicon substrate obtained as described above. The spin coating was performed by maintaining the rotation speed at 2000 rpm for 20 seconds.

Thereafter, the silicon substrate coated with COP solution A in this manner was held on a hot plate heated to 120° C. and dried to form a second polymer layer on the first thermally modified polymer layer. Thereafter, the second polymer layer was thermally modified by holding the substrate on a hot plate heated to 200° C. for 2 minutes, in order to form a second thermally modified polymer layer having a film thickness of 23 nm, which was adhered onto the first thermally modified polymer layer.

(5) Bonding of the Anti-Reflection Composite Film

The anti-reflection composite film obtained as described above was adhered onto the second thermally modified polymer layer of the silicon substrate obtained as described above such that the first anti-reflection layer was in contact with the second thermally modified polymer layer, and thermocompression bonding was performed at 115° C. and 0.2 MPa pressure for 60 minutes to adhere the anti-reflection composite film onto the second thermally modified polymer layer. The obtained evaluation laminate had, on the silicon substrate, the first thermally modified polymer layer, the second thermally modified polymer layer, the first anti-reflection layer, and the second anti-reflection layer in this order.

(Cross-Cut Test)

The evaluation laminate obtained as described above was subjected to a cross-cut test.

Specifically, on the anti-reflection composite film formed on the silicon substrate, cuts were made at 1 mm intervals to reach the silicon substrate using a utility knife. After six cuts were made, six more cuts were made orthogonal to these cuts, in order to form grid-like cuts.

Thereafter, Scotch-Mending Tape (manufactured by 3M Company; 810, 24-mm wide) was applied to the surfaces of the polymer member, and after finger-rubbing the tape from above to adhere it, the tape was peeled off. The area where the tape was stuck and peeled off in this way was observed by a stereomicroscope.

The evaluation results were classified as follows.

A: The edges of the cuts were perfectly smooth and no peeling was observed in any cells of the grid.

B: Although the polymer member was partially peeled off, less than 35% of the cross-cut section was affected.

C: Large part of the polymer member was peeled off; 35% or more of the cross-cut section was affected.

D: A cross-cut test was not performed because of poor adhesion of the polymer member to the substrate.

In the anti-reflection composite film of Example 1, the edges of the cut were completely smooth, and no peeling was observed in any cells of the grid (Rating A). The preparation conditions and evaluation results of the evaluation laminate according to Example 1 having the first and second thermally modified polymer layers and the first and second anti-reflection layers on the silicon substrate are shown in Table 1 below.

Examples 2 to 8

Evaluation laminates of Examples 2 to 8 having first and second thermally modified polymer layers and first and second anti-reflection layers on a silicon substrate were obtained in the same manner as in Example 1 except that a spray method was used as the method of forming the second anti-reflection layer (Example 2) and the volume ratio of the COP and the silicon particles was changed in the COP solution for preparing COP solution B2 (Examples 3 to 8). The evaluation laminates of Examples 2 to 8 were evaluated in the same manner as in Example 1. The preparation conditions and evaluation results of the evaluation laminates according to Examples 2 to 8 are shown in Table 1 below.

Example 9

An evaluation laminate having first and second thermally modified polymer layers and first and second anti-reflection layers on a silicon substrate was obtained in the same manner as in Example 1, except that the COP solution B2' (containing non-OTS-treated silicon particles) was obtained without performing surface treatment of the silicon particles using OTS in the manufacturing process of the COP solution B2, and that this COP solution B2' was used instead of the COP solution B2. The evaluation laminate according to Example 9 was evaluated in the same manner as in Example 1. The preparation conditions and evaluation results of the evaluation laminate according to Example 9 are shown in Table 1 below.

Comparative Example 1

An evaluation laminate having first and second anti-reflection layers on a silicon substrate was obtained in the same manner as in Example 9 except that the first and second thermally modified polymer layers were not formed. This evaluation laminate according to Comparative Example 1 was evaluated in the same manner as in Example 1. The preparation conditions and evaluation results of the evaluation laminate according to Comparative Example 1 are shown in Table 1 below.

Example 10

An evaluation laminate having first and second thermally modified polymer layers and first to fourth anti-reflection layers on a silicon substrate was obtained in the same manner as in Example 1, except as follows:

(i) A coating film was obtained by applying a COP solution B1 on a glass plate using a doctor blade, and a solvent in the coating film was removed by heating at 110° C. to obtain a fourth anti-reflection layer having a thickness of 25 μm on the glass plate;

(ii) After (i) above, a coating film was obtained by applying the COP solution B2 on the fourth anti-reflection layer using a doctor blade, and a solvent in the coating film was removed by heating at 110° C. to obtain a third anti-reflection layer having a thickness of 20 μm on the fourth anti-reflection layer;

(iii) Further, after (ii) above, a coating film was obtained by applying the COP solution B1 on the third anti-reflection layer using a doctor blade, and a solvent in the coating film was removed by heating at 110° C. to obtain a second anti-reflection layer having a thickness of 25 μm on the third anti-reflection layer;

(iv) Further, after (iii) above, a coating film was obtained by applying COP solution B2 on the second anti-reflection layer using a doctor blade, and a solvent in the coating film was removed by heating at 110° C. to obtain a first anti-reflection layer having a thickness of 20 μm on the second anti-reflection layer.

This evaluation laminate according to Example 10 was evaluated in the same manner as in Example 1. The preparation conditions and evaluation results of the evaluation laminate according to Example 10 are shown in Table 2 below.

Example 11

An evaluation laminate having first and second thermally modified polymer layers and first to third anti-reflection layers on a silicon substrate was obtained in the same manner as in Example 1, except as follows:

(i) A coating film was obtained by coating a COP solution B1 on a glass plate using a doctor blade, and a solvent in the coating film was removed by heating at 110° C. to obtain a third anti-reflection layer having a thickness of 25 μm on the glass plate;

(ii) After (i) above, a coating film was obtained by applying the COP solution BT used in Example 9, i.e., the COP solution containing silicon particles not subjected to a surface treatment with OTS, on the third anti-reflection layer using a doctor blade, and a solvent in the coating film was removed by heating at 110° C. to obtain a second anti-reflection layer having a thickness of 15 μm on the third anti-reflection layer;

(iii) Further, after (ii) above, a coating film was obtained by applying COP solution B2 on the second anti-reflection layer using a doctor blade, and a solvent in the coating film was removed by heating at 110° C. to obtain a first anti-reflection layer having a thickness of 5 μm on the second anti-reflection layer.

This evaluation laminate according to Example 11 was evaluated in the same manner as in Example 1. The preparation conditions and evaluation results of the evaluation laminate according to Example 11 are shown in Table 2 below.

TABLE 1

| | | Example 1 | Example 2 | Example 3 | Example 4 | Example 5 | Example 6 | Example 7 | Example 8 | Example 9 | Comp. Example 1 |
|---|---|---|---|---|---|---|---|---|---|---|---|
| Inorganic substrate | | Si | Si | Si | Si | S | Si | Si | Si | Si | Si |
| First thermally modified polymer layer | Polymer | COP | COP | COP | COP | COP | COP | COP | COP | COP | — |
| | Thermal modification temp. | 280° C. | 280° C. | 280° C. | 280° C. | 280° C. | 280° C. | 280° C. | 280° C. | 280° C. | — |
| Second thermally modified polymer layer | Polymer | COP | COP | COP | COP | COP | COP | COP | COP | COP | — |
| | Thermal modification temp. | 200° C. | 200° C. | 200° C. | 200° C. | 200° C. | 200° C. | 200° C. | 200° C. | 200° C. | — |
| First anti-reflection layer | Polymer | COP | COP | COP | GOP | COP | COP | COP | COP | ICOP | COP |
| | Filler | Si particles | Si particles | Si particles | Si particles | Si particles | Si particles | Si particles | Si particles | Si particles | Si particles |
| | Filler content | 35 vol % | 35 vol % | 30 vol % | 25 vol % | 20 vol % | 15 vol % | 10 vol % | 5 vol % | 35 vol % | 35 vol % |
| | Coupling agent | OTS | OTS | OTS | OTS | OTS | OTS | OTS | OTS | — | — |
| | Preparation method | Blade coating | Blade coating | Blade coating | Blade coating | Blade coating | Blade coating | Blade coating | Blade coating | Blade coating | Blade coating |
| | Thickness | 20 μm | 20 μm | 20 μm | 20 μm | 20 μm | 20 μm | 20 μm | 20 μm | 20 μm | 20 μm |
| Second anti-reflection layer | Polymer | COP | COP | COP | COP | COP | COP | COP | COP | COP | COP |
| | Filler | — | — | — | — | — | — | — | — | — | — |
| | Filler content | — | — | — | — | — | — | — | — | — | — |
| | Coupling agent | — | — | — | — | — | — | — | — | — | — |
| | Preparation method | Blade coating | Spraying | Blade coating | Blade coating | Blade coating | Blade coating | Blade coating | Blade coating | Blade coating | Blade coating |
| | Thickness | 25 μm | 25 μm | 25 μm | 25 μm | 25 μm | 25 μm | 25 μm | 25 μm | 25 μm | 25 μm |
| Bonding method for anti-reflection composite film | | Thermo-com-pression bonding | Thermo-com-pression bonding | Thermo-com-pression bonding | Thermo-com-pression bonding | Thermo-com-pression bonding | Thermo-com-pression bonding | Thermo-com-pression bonding | Thermo-com-pression bonding | Thermo-com-pression bonding | Thermo-com-pression bonding |
| Evaluation result | | A | A | A | A | A | A | A | A | C | D |

TABLE 2

| | | Example 10 | Example 11 |
|---|---|---|---|
| Inorganic substrate | | Si | Si |
| First thermally modified polymer layer | Polymer | COP | COP |
| | Thermal modification temp. | 280° C. | 280° C. |
| Second thermally modified polymer layer | Polymer | COP | COP |
| | Thermal modification temp. | 200° C. | 200° C. |
| First anti-reflection layer | Polymer | COP | COP |
| | Filler | Si particles | Si particles |
| | Filler content | 35 vol % | 35 vol % |
| | Coupling agent | OTS | OTS |
| | Preparation method | Blade coating | Blade coating |
| | Thickness | 20 μm | 5 μm |
| Second anti-reflection layer | Polymer | COP | COP |
| | Filler | — | Si particles |
| | Filler content | — | 35 vol % |
| | Coupling agent | — | — |
| | Preparation method | Blade coating | Blade coating |
| | Thickness | 25 μm | 15 μm |
| Third anti-reflection layer | Polymer | COP | COP |
| | Filler | Si particles | — |
| | Filler content | 5 vol % | — |
| | Coupling agent | OTS | — |
| | Preparation method | Blade coating | Blade coating |
| | Thickness | 20 μm | 25 μm |
| Fourth anti-reflection layer | Polymer | — | — |
| | Filler | — | — |
| | Filler content | — | — |
| | Coupling agent | COP | — |
| | Preparation method | Blade coating | — |
| | Thickness | 25 μm | — |
| Bonding method for anti-reflection composite film | | (Ⓧ) | (Ⓧ) |
| Evaluation result | | A | A |

(Ⓧ) Thermocompression bonding

From the comparison between Examples 1 to 11 and Comparative Example 1, it is understood that by bonding an anti-reflection film (polymer member) to an inorganic substrate via a thermally modified polymer layer, adhesion of the anti-reflection film to the inorganic substrate is improved.

Further, as can be seen in Table 1 and Table 2, it is understood that when an anti-reflection film (polymer member) contains a coupling agent, adhesion between the thermally modified polymer layer and the anti-reflection film is further improved even when the anti-reflection layer contains inorganic particles.

Reference Examples 1 to 14 and Reference Comparative Examples 1 and 2

In the following Reference Examples and Reference Comparative Examples, the formation of thermally modified polymer layers and the adhesion of a polymer member to a thermally modified polymer layer are evaluated.

Polymers used for the formation of thermally modified polymer layers and polymer members in the following reference examples are as follows:

COP1: Cyclic olefin polymer (ARTON™ (JSR Corporation))

COP2: Cyclic olefin polymer (Zeon Corporation, ZEONEX™ 480R, glass transition temperature 138° C.)

Reference Examples 1 to 14 and Reference Comparative Examples 1 and 2

As described below, in Reference Examples 1 to 14, COP1 was used as a material for both thermally modified polymer layers and polymer members. In addition, in Reference Comparative Examples 1 and 2, thermally modified polymer layers were not used, and COP1 was used as a material of a polymer member.

Reference Example 1

(Preparation of Solution for Thermally Modified Polymer Layer)

A solution for thermally modified polymer layer was obtained by mixing and stirring 7% by mass of COP1 and 93% by mass of chloroform at room temperature.

(Formation of First Thermally Modified Polymer Layer)

A silicon substrate was used as inorganic substrate, and the solution for thermally modified polymer layer was spin-coated on the silicon substrate. The spin coating was performed by maintaining the rotation speed at 2000 rpm for 20 seconds.

Thereafter, the silicon substrate coated with the solution for thermally modified polymer layer in this manner was held on a hot plate heated to 120° C. to dry the solution for thermally modified polymer layer, in order to obtain a silicon substrate with a first polymer layer, and then the first polymer layer was thermally modified (thermally denatured) by holding the substrate on a hot plate heated to 280° C. for 1 minutes to obtain a silicon substrate with a first thermally modified polymer layer having a film thickness of 23 nm.

(Formation of Second Thermally Modified Polymer Layer)

The solution for thermally modified polymer layer was spin-coated on the first thermally modified polymer layer of the silicon substrate obtained as described above. The spin coating was performed by maintaining the rotation speed at 2000 rpm for 20 seconds.

Thereafter, the silicon substrate coated with the solution for thermally modified polymer layer in this manner was held on a hot plate heated to 120° C. to dry the solution for thermally modified polymer layer, in order to form a second polymer layer on the first thermally modified polymer layer. Then, the second polymer layer was thermally modified by holding the substrate on a hot plate heated to 200° C. for 2 minutes to obtain a second thermally modified polymer layer having a film thickness of 23 nm, which was adhered onto the first thermally modified polymer layer. A composite of thermally modified polymer layer and inorganic substrate thus obtained was used as the composite of thermally modified polymer layer and inorganic substrate according to Reference Example 1.

(Preparation of Solution for Polymer Member)

A solution for polymer member was obtained by mixing and stirring 7% by mass of COP1 and 93% by mass of chloroform at room temperature.

(Bonding of Polymer Member)

The solution for polymer member was spin-coated on the second thermally modified polymer layer obtained as described above. The spin coating was performed by maintaining the rotation speed at 2000 rpm for 20 seconds.

Thereafter, the silicon substrate coated with the solution for polymer member in this manner was held on a hot plate heated to 140° C. for 10 minutes to dry the solution for polymer member, in order to bond a polymer member having a film thickness of 23 nm onto the second thermally modified polymer layer. A composite of polymer member and inorganic substrate thus obtained was used as the composite of polymer member and inorganic substrate according to Reference Example 1.

(Cross-Cut Test)

On the laminate of the first and second thermally modified polymer layers and the polymer member formed on the silicon substrate, cuts reaching the silicon substrate were made at 1 mm intervals by using a utility knife. After six cuts were made, six more cuts were made orthogonal to these cuts to form grid-like cuts.

Thereafter, Scotch-Mending Tape (3M Company; 810, 24-mm wide) was applied to the surfaces of the polymer member, and after finger-rubbing the tape from above to adhere it, the tape was peeled off. The area where the tape was stuck and peeled off in this way was observed by a stereomicroscope.

The evaluation results were classified as follows.

A: The edges of the cuts were perfectly smooth and no peeling was observed in any cells of the grids.

B: Although the polymer member was partially peeled off, less than 35% of the cross-cut section was affected.

C: Large part of the polymer member was peeled off, and 35% or more of the cross-cut section was affected.

In the composite of polymer member and inorganic substrate of Reference Example 1, the edges of the cuts were completely smooth, and no peeling was observed in any cells of the grids (Rating A). The preparation conditions and evaluation results for this composite material are shown in Table R1 below.

Reference Examples 2 to 8

Composites of polymer member and inorganic substrate according to Reference Examples 2 to 8 was prepared in the same manner as in Reference Example 1, except that the concentration of the polymer in the solution for thermally modified polymer layer was changed (Reference Examples 2 and 3), the spin coating condition of the solution for thermally modified polymer layer was changed (Reference Example 4), or the temperature of thermal modification of the first thermally modified polymer was changed (Reference Examples 5 to 8), as in Tables R1 and R2. The composites thus prepared were evaluated in the same manner as in Reference Example 1. The preparation conditions and evaluation results of these composite materials are shown in Tables R1 and R2 below.

Reference Example 3A (Formation of First and Second Thermally Modified Polymer Layers)

A first thermally modified polymer layer and a second thermally modified polymer were formed on a silicon substrate in the same manner as in Reference Example 1, except that the temperature of thermal modification for the first thermally modified polymer was 300° C., and the temperature of thermal modification for the second thermally modified polymer was 280° C. and the treatment was performed for 1 minute.

(Formation of Third Thermally Modified Polymer Layer)

The solution for thermally modified polymer layer was spin-coated on the second thermally modified polymer layer obtained as described above. The spin coating was performed by maintaining the rotation speed at 2000 rpm for 20 seconds.

Thereafter, the silicon substrate coated with the solution for thermally modified polymer layer in this manner was held on a hot plate heated to 120° C. to dry the solution for thermally modified polymer layer, in order to form a third polymer layer on the second thermally modified polymer layer. Then, the third polymer layer was thermally modified by holding the substrate on a hot plate heated to 200° C. for 2 minutes to obtain a third thermally modified polymer layer having a film thickness of 23 nm, which was adhered onto the second thermally modified polymer layer. A composite of thermally modified polymer layer and inorganic substrate thus obtained was used as the composite of thermally modified polymer layer and inorganic substrate of Reference Example 3A (Bonding of Polymer Member)

Thereafter, the composite of polymer member and inorganic substrate according to Reference Example 3A was prepared by performing bonding of the polymer member in the same manner as in Reference Example 1.

(Cross-Cut Test)

The composite of polymer member and inorganic substrate according to Reference Example 3A was evaluated in the same manner as in Reference Example 1.

The preparation conditions and evaluation results of this composite material are shown in Table R1 below.

Reference Comparative Example 1

The composite of polymer member and inorganic substrate according to Reference Comparative Example 1 was prepared in the same manner as in Reference Example 1, except that first and second thermally modified polymer layers were not formed on a silicon substrate which was used as an inorganic substrate, and that COP1 was spin-coated directly on the silicon substrate. The obtained composite was evaluated in the same manner as in Reference Example 1. The preparation conditions and evaluation results of this composite material are shown in Tables R1 and R2 below.

Reference Example 9

The composite of polymer member and inorganic substrate according to Reference Example 9 was prepared and evaluated in the same manner as in Reference Example 1, except that instead of spin-coating the cyclic olefin polymer during bonding of the polymer member, a film of COP1 (with a thickness of 100 μm) was placed on the second thermally modified polymer layer and held at 50 MPa pressure and 140° C. for 2 hours for the thermocompression-bonding of the film and the second thermally modified polymer layer. The preparation conditions and evaluation results of this composite material are shown in Table R3 below.

Reference Comparative Example 2

The composite polymer member and inorganic substrate according to Reference Comparative Example 2 was prepared in the same manner as in Reference Example 9, except that first and second thermally modified polymer layer were not formed on a silicon substrate which was used as an inorganic substrate, and a film of COP1 (thickness: 100 μm) was bonded directly onto the silicon substrate by thermo-compression-bonding. The obtained composite was evaluated in the same manner as in Reference Example 1. The preparation conditions and evaluation results of this composite material are shown in Table R3 below.

Reference Examples 10 to 14

Composites of polymer member and inorganic substrate according to Reference Examples 10 to 14 were prepared in the same manner as in Reference Examples 5, 6, 1, 7 and 8, respectively, except that after the first thermally modified polymer layer was formed on the silicon substrate which was used as an inorganic substrate, a solution for polymer member was spin-coated directly on the first thermally modified polymer layer without forming a second thermally modified polymer layer. The obtained composites were evaluated in the same manner as in Reference Example 1. The preparation conditions and evaluation results for these composite materials are shown in Table R4 below.

Reference Examples 15 to 20 and Reference Comparative Example 3

As described below, in Reference Examples 15 to 20, COP2 was used as a material for both the thermally modified polymer layer and the film of the polymer member. In addition, in Reference Comparative Example 3, the thermally modified polymer layer was not used, and COP2 was used as a material of the film of the polymer member.

Reference Example 15

The composite of polymer member and inorganic substrate according to Reference Example 15 was prepared in the same manner as in Reference Example 1, except that in the preparation of both the solution for thermally modified polymer layer and the solution for polymer member, a solution for thermally modified polymer layer was obtained by mixing and stirring 10% by mass of COP2 and 90% by mass of toluene at room temperature. The obtained composite was evaluated in the same manner as in Reference Example 1. The conditions and evaluation results of this composite material are shown in Table R5 below.

Reference Example 16

The composite of polymer member and inorganic substrate according to Reference Example 16 was prepared in the same manner as in Reference Example 15, except that the concentration of polymer in the solution for forming thermally modified polymer layer was changed from 10% by mass to 1% by mass. The obtained composite was evaluated in the same manner as in Reference Example 1. The preparation conditions and evaluation results of this composite are shown in Table R5 below.

Reference Comparative Example 3

The composite of polymer member and inorganic substrate according to Reference Comparative Example 3 was prepared in the same manner as in Reference Example 15, except that first and second thermally modified polymer layers were not formed on the silicon substrate which was used as an inorganic substrate, and that COP2 was spin-coated directly on the silicon substrate. The obtained composite was evaluated in the same manner as in Reference Example 1. The preparation conditions and evaluation results for this composite material are shown in Table R5 below.

Reference Examples 17 to 20

Composites of polymer member and inorganic substrate according to Reference Examples 17 to 20 were prepared in the same manner as in Reference Example 15, except that the temperature of thermal modification for the first thermally modified polymer was changed as in Table R6. The obtained composites were evaluated in the same manner as in Reference Example 1. The preparation conditions and evaluation results for these composite materials are shown in Table R6 below.

Reference Example 21 and Reference Comparative Example 4

As described below, in Reference Example 21, a polyethylene (PE) film (thickness: 30 µm) was used as a material for both the thermally modified polymer layer and the polymer member. In addition, in Reference Comparative Example 4, the thermally modified polymer layer was not used, and a polyethylene film (thickness: 30 µm) was used as a material of the polymer member.

Reference Example 21

(Formation of First Thermally Modified Polymer Layer)

A silicone substrate as inorganic substrate having a polyethylene film (30 µm thickness) thereon was heated to 120° C. and held for 1 minute to obtain a silicon substrate with a polyethylene film, and then the polyethylene film was thermally modified by holding the substrate on a hot plate heated to 280° C. for 1 minute, in order to obtain a silicon substrate with a first thermally modified polymer layer.

(Formation of Second Thermally Modified Polymer Layer)

A polyethylene film (thickness: 30 µm) was placed on the first thermally modified polymer layer of the silicon substrate obtained as described above, and the substrate was heated to 120° C. and held for 1 minute to adhere the polyethylene film onto the first thermally modified polymer layer. Then, the polyethylene film was thermally modified by holding the substrate on a hot plate heated to 200° C. for 2 minutes, in order to obtain a second thermally modified polymer layer, which was adhered onto the first thermally modified polymer layer. A composite of thermally modified polymer layer and inorganic substrate thus obtained was used as the composite of thermally modified polymer layer and inorganic substrate according to Reference Example 21.

(Bonding of Polymer Member)

A polyethylene film (thickness: 30 µm) was placed on the second thermally modified polymer layer obtained as described above, and the substrate was heated to 120° C. and held for 1 minute, and further heated to 140° C. and held for 10 minutes, to bond the polyethylene film as polymer member onto the first thermally modified polymer layer. A composite of polymer member and inorganic substrate thus obtained was used as the composite of polymer member and inorganic substrate according to Reference Example 21, and evaluated in the same manner as in Reference Example 1. The preparation conditions and evaluation results for this composite material are shown in Table R7 below.

Reference Comparative Example 4

The composite of polymer member and inorganic substrate according to Reference Comparative Example 4 was prepared in the same manner as in Reference Example 21, except that first and second thermally modified polymer layer were not formed on a silicon substrate which was used as an inorganic substrate, and a polyethylene film as polymer member was bonded directly onto the silicon substrate. The obtained composite was evaluated in the same manner as in Reference Example 1. The preparation conditions and evaluation results for this composite material are shown in Table R7 below.

Reference Examples 22 to 27

As described below, in Reference Examples 22 to 27, different polymers were used for the material of thermally modified polymer layer and for the material of polymer member.

Reference Examples 22 and 23

(Formation of First and Second Thermally Modified Polymer Layer)

A silicon substrate was used as an inorganic substrate, and, as in Reference Example 1, COP1 was used to form first and second thermally modified polymer layers on the silicon substrate.

(Bonding of Polymer Member)

In Reference Example 22, the solution for polymer member of COP2 obtained as described in Reference Example 15 was spin-coated on the second thermally modified polymer layer obtained as described above, and dried to form a composite of polymer member and inorganic substrate according to Reference Example 22. The obtained composite was evaluated in the same manner as in Reference Example 1. The preparation conditions and evaluation results for this composite material are shown in Table R8 below.

In Reference Example 23, a polyethylene film (thickness: 30 μm) was bonded as in Reference Example 21 on the second thermally modified polymer layer obtained as described above to form a composite of polymer member and inorganic substrate according to Reference Example 23. The obtained composite was evaluated in the same manner as in Reference Example 1. The preparation conditions and evaluation results of this composite material are shown in Table R8 below.

Reference Examples 24 and 25

(Formation of First and Second Thermally Modified Polymer Layer)

A silicon substrate was used as an inorganic substrate, and as in Reference Example 15, COP2 was used to form first and second thermally modified polymer layers on the silicon substrate.

(Bonding of Polymer Member)

In Reference Example 24, the solution for polymer member of COP1 obtained as described in Reference Example 1 was spin-coated on the second thermally modified polymer layer obtained as described above, and dried to form a composite of polymer member and inorganic substrate according to Reference Example 24. The obtained composite was evaluated in the same manner as in Reference Example 1. The preparation conditions and evaluation results of this composite material are shown in Table R8 below.

In Reference Example 25, a polyethylene film (thickness: 30 μm) was bonded as in Reference Example 21 on the second thermally modified polymer layer obtained as described above to form a composite of polymer member and inorganic substrate according to Reference Example 25. The obtained composite was evaluated in the same manner as in Reference Example 1. The preparation conditions and evaluation results for this composite material are shown in Table R8 below.

Reference Examples 26 and 27

(Formation of First and Second Thermally Modified Polymer Layer)

A silicon substrate was used as an inorganic substrate, and as in Reference Example 21, a polyethylene film (thickness: 30 μm) was used to form first and second thermally modified polymer layer on the silicon substrate.

(Bonding of Polymer Member)

In Reference Example 26, the solution for polymer member of COP1 obtained as described in Reference Example 1 was spin-coated on the second thermally modified polymer layer obtained as described above, and dried to form a composite of polymer member and inorganic substrate according to Reference Example 26. The obtained composite was evaluated in the same manner as in Reference Example 1. The preparation conditions and evaluation results of this composite material are shown in Table R8 below.

In Reference Example 27, the solution for polymer member of COP2 obtained as described in Reference Example 15 was spin-coated on the second thermally modified polymer layer obtained as described above, and dried to form a composite of polymer member and inorganic substrate of Reference Example 26. The obtained composite was evaluated in the same manner as in Reference Example 1. The preparation conditions and evaluation results of this composite material are shown in Table R8 below.

Reference Examples 28 to 30 and Reference Comparative Examples 5 to 7

Reference Examples 28 to 30

Composites of polymer member and inorganic substrate according to Reference Examples 28 to 30 were prepared in the same manner as in Reference Example 15, except that a silicon substrate with an SiN layer formed on the surface thereof (Reference Example 28), a copper plate (Reference Example 29), and an aluminum plate (Reference Example 30) were used as an inorganic substrate, respectively, instead of a silicon substrate. The obtained composites were evaluated in the same manner as in Reference Example 1. The preparation conditions and evaluation results of these composite materials are shown in Table R9 below.

Reference Comparative Examples 5 to 7

Composites of polymer member and inorganic substrate according to Reference Comparative Examples 5 to 7 were prepared in the same manner as in Reference Examples 28 to 30, respectively, except that the thermally modified polymer layer was not used. The obtained composites were evaluated in the same manner as in Reference Example 1. The preparation conditions and evaluation results of these composite materials are shown in the following table.

Reference Comparative Examples 8 to 13

As described below, in Reference Comparative Examples 8 to 13, a silicon substrate as inorganic substrate was treated with a silane coupling agent, and a polymer member was bonded to this treated surface.

Reference Comparative Examples 8 and 9

An OTS-treated silicon substrate was obtained by treating a silicon substrate as an inorganic substrate with ultraviolet and ozone (UV/O$_3$ treatment), and then by holding the substrate for 3 hours in a saturated vapor pressure atmosphere at 150° C. of octadecyltriethoxysilane (OTS) as a silane coupling agent.

In Reference Comparative Example 8, without forming a thermally modified polymer layer on the surface of the OTS-treated silicon substrate thus obtained, a polymer member was bonded by spin-coating in the same manner as in Reference Example 15 to form a composite of polymer member and inorganic substrate according to Reference Comparative Example 8. The obtained composite was evaluated in the same manner as in Reference Example 1. The preparation conditions and the evaluation results for this composite material are shown in Table R10 below.

In Reference Comparative Example 9, without forming a thermally modified polymer layer on the surface of the OTS-treated silicon substrate thus obtained, a polymer member was bonded by thermocompression-bonding in the same manner as in Reference Example 21 to form a composite of polymer member and inorganic substrate according to Reference Comparative Example 9. The obtained composite was evaluated in the same manner as in Reference Example 1. The preparation conditions and evaluation results of this composite material are shown in Table R10 below.

Reference Comparative Examples 10 and 11

Composites of polymer member and inorganic substrate according to Reference Comparative Examples 10 to 11 were prepared in the same manner as in Reference Comparative Examples 8 and 9, respectively, except that 3-phenylpropyltriethoxysilane (PTS) was used as a silane coupling agent instead of octadecyltriethoxysilane (OTS). The obtained composites were evaluated in the same manner as in Reference Example 1. The preparation conditions and evaluation results of these composite material are shown in Table R10 below.

Reference Comparative Examples 12 and 13

Composites of polymer member and inorganic substrate according to Reference Comparative Examples 12 to 13 were prepared in the same manner as in Reference Comparative Examples 8 and 9, respectively, except that 3-aminopropyltriethoxysilane (ATS) was used as a silane coupling agent instead of octadecyltriethoxysilane (OTS). The obtained composites were evaluated in the same manner as in Reference Example 1. The preparation conditions and evaluation results of these composite material are shown in Table R10 below.

TABLE 3

Table R1

| | | | | Thermally modified polymer layer | | | | | | | | |
|---|---|---|---|---|---|---|---|---|---|---|---|---|
| | | | | Preparation condition | | | | | | | | |
| | | Material | | | First thermally modified polymer layer | | Second thermally modified polymer layer | | Third thermally modified polymer layer | | Polymer member | Result of cross |
| | Inorganic substrate | Solvent | Polymer | Polymer concentration (mass %) | Temp. (° C.) | Time (min) | Temp. (° C.) | Time (min) | Temp. (° C.) | Time (min) | Material | Bonding method | cut test |
| Ref.Ex.1 | S i | Chloroform | C O P 1 * [1] | 7 | 280 | 1 | 200 | 2 | | | C O P 1 | Spin coating | A |
| Ref.Ex.2 | S i | Chloroform | C O P 1 | 3 | 280 | 1 | 200 | 2 | | | C O P 1 | Spin coating | A |
| Ref.Ex.3 | S i | Chloroform | C O P 1 | 1 | 280 | 1 | 200 | 2 | | | C O P 1 | Spin coating | A |
| Ref.Ex.3A | S i | Chloroform | C O P 1 | 1 | 300 | 1 | 280 | 1 | 200 | 2 | C O P 1 | Spin coating | A |
| Ref.Ex.4 * [2] | S i | Chloroform | C O P 1 | 1 | 280 | 1 | 200 | 2 | | | C O P 1 | Spin coating | A |
| RefComp.Ex.1 | S i | | | | | | | | | | C O P 1 | Spin coating | C |

* [1]: COP1 is a cyclic olefin polymer(JSR Corporation, ARTON ™)

* [2]: Reference Ex.4 is identical to Reference Ex.3 except that the rotation speed of the spin coating in preparation of thermally modified polymer layer was changed from 2000 rpm to 6000 rpm

TABLE 4

Table R2

| | | Thermally modified polymer layer | | | | | | | | | |
| | | Material | | | First thermally modified polymer layer | | Second thermally modified polymer layer | | Polymer member | | Result of cross cut test |
| Inorganic substrate | Solvent | Polymer | Polymer concentration (mass %) | Temp. (° C.) | Time (min) | Temp. (° C.) | Time (min) | Material | Bonding method | |
|---|---|---|---|---|---|---|---|---|---|---|---|
| Ref.Ex.5 | S i | Chloroform | C O P 1 * 1 | 7 | 360 | 1 | 200 | 2 | C O P 1 | Spin coating | B |
| Ref.Ex.6 | S i | Chloroform | C O P 1 | 7 | 320 | 1 | 200 | 2 | C O P 1 | Spin coating | B |
| Ref.Ex.1 | S i | Chloroform | C O P 1 | 7 | 280 | 1 | 200 | 2 | C O P 1 | Spin coating | A |
| Ref.Ex7 | S i | Chloroform | C O P 1 | 7 | 240 | 1 | 200 | 2 | C O P 1 | Spin coating | B |
| Ref.Ex.8 | S i | Chloroform | C O P 1 | 7 | 200 | 1 | 200 | 2 | C O P 1 | Spin coating | B |
| RefComp.Ex1 | S i | | | | | | | | C O P 1 | Spin coating | C |

* 1: COP1 is a cyclic olefin polymer (JSR Corporation, ARTON ™)

TABLE 5

Table R3

| | | Thermally modified polymer layer | | | | | | | | | |
| | | Material | | | First thermally modified polymer layer | | Second thermally modified polymer layer | | Polymer member | | Result of cross cut test |
| Inorganic substrate | Solvent | Polymer | Polymer concentration (mass %) | Temp. (° C.) | Time (min) | Temp. (° C.) | Time (min) | Material | Bonding method | |
|---|---|---|---|---|---|---|---|---|---|---|---|
| Ref.Ex.9 | S i | Chloroform | C O P 1 * 1 | 7 | 280 | 1 | 200 | 2 | COP1 film | (✗) | A |
| Ref.Comp.Ex.2 | S i | | | | | | | | COP1 film | (✗) | C |

* 1: COP1 is a cyclic olefin polymer (JSR Corporation, ARTON ™)
(✗) Thermocompression bonding

TABLE 6

Table R4

| | | Thermally modified polymer layer | | | | | | | | | |
| | | Material | | | First thermally modified polymer layer | | Second thermally modified polymer layer | | Polymer member | | Result of cross cut test |
| Inorganic substrate | Solvent | Polymer | Polymer concentration (mass %) | Temp. (° C.) | Time (min) | Temp. (° C.) | Time (min) | Material | Bonding method | |
|---|---|---|---|---|---|---|---|---|---|---|---|
| Ref.Ex.10 | S i | Chloroform | C O P 1 * 1 | 7 | 360 | 1 | | | C O P 1 | Spin coating | B |
| Ref.Ex.11 | S i | Chloroform | C O P 1 | 7 | 320 | 1 | | | C O P 1 | Spin coating | B |
| Ref.Ex.12 | S i | Chloroform | C O P 1 | 7 | 280 | 1 | | | C O P 1 | Spin coating | B |

TABLE 6-continued

Table R4

| | | Thermally modified polymer layer | | | | | | | | | |
|---|---|---|---|---|---|---|---|---|---|---|---|
| | | | | | | Preparation condition | | | | | |
| | | Material | | | | First thermally modified polymer layer | | Second thermally modified polymer layer | | Polymer member | | Result of |
| | Inorganic substrate | Solvent | Polymer | Polymer concentration (mass %) | Temp. (° C.) | Time (min) | Temp. (° C.) | Time (min) | Material | Bonding method | cross cut test |
| Ref.Ex.13 | S i | Chloroform | C O P 1 | 7 | 240 | 1 | | | C O P 1 | Spin coating | B |
| Ref.Ex.14 | S i | Chloroform | C O P 1 | 7 | 200 | 1 | | | C O P 1 | Spin coating | B |
| Ref.Comp.Ex.1 | S i | | | | | | | | C O P 1 | Spin coating | C |

*[1]: COP1 is a cyclic olefin polymer (JSR Corporation, ARTON ™)

TABLE 7

Table R5

| | | Thermally modified polymer layer | | | | | | | | | |
|---|---|---|---|---|---|---|---|---|---|---|---|
| | | | | | | Preparation condition | | | | | |
| | | Material | | | | First thermally modified polymer layer | | Second thermally modified polymer layer | | Polymer member | | Result of |
| | Inorganic substrate | Solvent | Polymer | Polymer concentration (mass %) | Temp. (° C.) | Time (min) | Temp. (° C.) | Time (min) | Material | Bonding method | cross cut test |
| Ref.Ex.15 | S i | Toluene | C O P 2 *[3] | 10 | 280 | 1 | 200 | 2 | C O P 2 | Spin coating | A |
| Ref.Ex.16 | S i | Toluene | C O P 2 | 1 | 280 | 1 | 200 | 2 | C O P 2 | Spin coating | A |
| Ref.Comp.Ex.31 | S i | | | | | | | | C O P 2 | Spin coating | C |

*[3]: COP2 is a cyclic olefin polymer (Zeon Corporation, Zeonex ™ 480R)

TABLE 8

Table R6

| | | Thermally modified polymer layer | | | | | | | | | |
|---|---|---|---|---|---|---|---|---|---|---|---|
| | | | | | | Preparation condition | | | | | |
| | | Material | | | | First thermally modified polymer layer | | Second thermally modified polymer layer | | Polymer member | | Result of |
| | Inorganic substrate | Solvent | Polymer | Polymer concentration (mass %) | Temp. (° C.) | Time (min) | Temp. (° C.) | Time (min) | Material | Bonding method | cross cut test |
| Ref.Ex.17 | S i | Toluene | C O P 2 *[3] | 10 | 360 | 1 | 200 | 2 | C O P 2 | Spin coating | B |
| Ref.Ex.18 | S i | Toluene | C O P 2 | 10 | 320 | 1 | 200 | 2 | C O P 2 | Spin coating | B |
| Ref.Ex.10 | S i | Toluene | C O P 2 | 10 | 280 | 1 | 200 | 2 | C O P 2 | Spin coating | A |
| Ref.Ex.19 | S i | Toluene | C O P 2 | 10 | 240 | 1 | 200 | 2 | C O P 2 | Spin coating | B |
| Ref.Ex.20 | S i | [Toluene | C O P 2 | 10 | 200 | 1 | 200 | 2 | C O P 2 | Spin coating | B |
| Ref Comp.Ex.3 | S i | | | | | | | | C O P 2 | Spin coating | C |

*[3]: COP2 is a cyclic olefin polymer (Zeon Corporation, Zeonex ™ 480R)

TABLE 9

Table R7

| | | | First thermally modified polymer layer | | Second thermally modified polymer layer | | Polymer member | | Result of |
| | | | | | | | | | |
| | Inorganic substrate | Material | Temp. (° C.) | Time (min) | Temp. (° C.) | Time (min) | Material | Bonding method | cross cut test |
|---|---|---|---|---|---|---|---|---|---|
| Ref.Ex.21 | S i | PE film * ⁴ | 280 | 1 | 200 | 2 | PE film | (✗) | A |
| Ref.Comp.Ex.4 | S i | | | | | | PE film | (✗) | C |

* ⁴: PE film is a polyethylene film (thickness of 30 μm)
(✗) Thermocompression bonding

TABLE 10

Table R8

Thermally modified polymer layer

| | | Material | | | First thermally modified polymer layer | | Second thermally modified polymer layer | | Polymer member | | Result of |
| | | | | | | | | | | | |
| | Inorganic substrate | Solvent | Polymer | Polymer concentration (mass %) | Temp. (° C.) | Time (min) | Temp. (° C.) | Time (min) | Material | Bonding method | cross cut test |
|---|---|---|---|---|---|---|---|---|---|---|---|
| Ref.Ex.22 | S i | Chloroform | C O P 1 * ¹ | 7 | 280 | 1 | 200 | 2 | C O P 2 | Spin coating | B |
| Ref.Ex.23 | S i | Chloroform | C O P 1 | 7 | 280 | 1 | 200 | 2 | PE film | (✗) | B |
| Ref.Ex.24 | S i | Toluene | C O P 2 * ³ | 10 | 280 | 1 | 200 | 2 | C O P 1 | Spin coating | A |
| Ref.Ex.25 | S i | Toluene | C O P 2 | 10 | 280 | 1 | 200 | 2 | PE film | (✗) | B |
| Ref.Ex.26 | S i | | PE film * ⁴ | | 280 | 1 | 200 | 2 | C O P 1 | Spin coating | B |
| Ref.Ex.27 | S i | | PE film | | 280 | 1 | 200 | 2 | C O P 2 | Spin coating | B |
| Ref.Comp.Ex.1 | S i | | | | | | | | C O P 1 | Spin coating | C |
| RefComp.Ex.3 | S i | | | | | | | | C O P 2 | Spin coating | C |
| Ref.Comp.Ex.4 | S i | | | | | | | | PE film | (✗) | C |

* ¹: COP1 is a cyclic olefin polymer (JSR Corporation, ARTON ™)

* ³: COP2 is a cyclic olefin polymer (Zeon Corporation, Zeonex ™ 480R)

* ⁴: PE film is a polyethylene film (thickness of 30 μm)

(✗) Thermocompression bonding

TABLE 11

Table R9

| | Material | | | Preparation condition | | | | Polymer member | | Result of |
| | | | | First thermally modified polymer layer | | Second thermally modified polymer layer | | | | |
| | Inorganic substrate | Solvent | Polymer | Polymer concentration (mass %) | Temp. (° C.) | Time (min) | Temp. (° C.) | Time (min) | Material | Bonding method | cross cut test |
|---|---|---|---|---|---|---|---|---|---|---|---|
| Ref Ex.28 | S I N | Toluene | C O P 2 * 3 | 10 | 280 | 1 | 200 | 2 | C O P 2 | Spin coating | A |
| Ref.Comp.Ex.5 | S I N | | | | | | | | C O P 2 | Spin coating | C |
| Ref.Ex.29 | C u | Toluene | C O P 2 | 10 | 280 | 1 | 200 | 2 | C O P 2 | Spin coating | A |
| Ref.Comp.Ex.6 | C u | | | | | | | | C O P 2 | Spin coating | C |
| Ref.Ex.30 | A l | Toluene | C O P 2 | 10 | 280 | 1 | 200 | 2 | C O P 2 | Spin coating | A |
| Ref.Comp.Ex.7 | A l | | | | | | | | C O P 2 | Spin coating | C |

* 3: COP2 is a cyclic olefin polymer (Zeon Corporation, Zeonex ™ 480R)

TABLE 12

Table R10

| | Material | | | Preparation condition | | | | Polymer member | | Result of |
| | | | | First thermally modified polymer layer | | Second thermally modified polymer layer | | | | |
| | Inorganic substrate | Solvent | Polymer | Polymer concentration (mass %) | Temp. (° C.) | Time (min) | Temp. (° C.) | Time (min) | Material | Bonding method | cross cut test |
|---|---|---|---|---|---|---|---|---|---|---|---|
| Ref.Comp.Ex.8 | OTS treated Si | | | | | | | | C O P 2 * 3 | Spin coating | C |
| Ref.Comp.Ex.9 | OTS treated Si | | | | | | | | PE film ** | (X) | C |
| Ref.Comp.Ex.10 | PTS treated Si | | | | | | | | C O P 2 | Spin coating | C |
| Ref.Comp.Ex.11 | PTS treated Si | | | | | | | | PE film | (X) | C |
| Ref. Comp.Ex.12 | ATS treated Si | | | | | | | | C O P 2 | Spin coating | C |
| Ref.Comp.Ex.13 | ATS treated Si | | | | | | | | PE film | (X) | C |

* 3: COP2 is a cyclic olefin polymer (Zeon Corporation, Zeonex ™ 480R)
(X) Thermocompression bonding
* 4: PE film is a polyethylene film (thickness of 30 μm)

<Evaluation Result>

From Table R1 above, it is understood that, when the polymer concentration in the polymer solution for forming thermally modified polymer layer was 1 to 7% by mass and the rotation speed of the spin-coating at the time of forming thermally modified polymer layer was 2000 to 4000 rpm (Reference Examples 1 to 4), peeling of the polymer member was suppressed as compared with the case where the thermally modified polymer layer was not used (Reference Comparative Example 1).

In addition, from Table R1 above, it is understood that, not only when two thermally modified polymer layers were used (Reference Examples 1 to 4) but also when three thermally modified polymer layers were used (Reference Example 3A), peeling of the polymer member was suppressed as compared with the case where the thermally modified polymer layer was not used (Reference Comparative Example 1).

From Table R2 above, it is understood that, when the thermal modification temperature for forming thermally modified polymer layer was 200° C. to 360° C. (Reference Examples 1 and 5 to 8), peeling of the polymer member was suppressed as compared with a case where the thermally modified polymer layer was not used (Reference Comparative Example 1).

From Table R3 above, it is understood that, when the polymer member film was bonded to the thermally modified polymer layer by thermocompression-bonding (Reference Example 9), peeling of the polymer member was suppressed as compared with the case where the polymer member was directly bonded to the silicon substrate by thermocompression-bonding without using the thermally modified polymer layer (Reference Comparative Example 2).

From Table R4 above, it is understood that, even when only one thermally modified polymer layer was used instead of two thermally modified polymer layers (Reference Examples 10 to 14), peeling of the polymer member was suppressed as compared with the case where the thermally modified polymer layer was not used (Reference Comparative Example 1)

From Table R5 above, it is understood that, when the polymer concentration in the polymer solution for forming thermally modified polymer layer was 1 to 10% by mass (Reference Examples 15 to 16), peeling of the polymer member was suppressed as compared with the case where the thermally modified polymer layer was not used (Reference Comparative Example 3)

From Table R6 above, it is understood that, when the thermal modification temperature for forming thermally modified polymer layer was 200° C. to 360° C. (Reference Examples 10 and 17 to 20), peeling of the polymer member was suppressed as compared with the case where the thermally modified polymer layer was not used (Reference Comparative Example 3).

From Table R7 above, it is understood that, when the polymer member film was bonded to the thermally modified polymer layer by thermocompression-bonding (Reference Example 21), peeling of the polymer member was suppressed as compared with the case where the polymer member film was directly bonded to the silicon substrate by thermocompression-bonding without using the thermally modified polymer layer (Reference Comparative Example 4).

From Table R8 above, it is understood that, even under the condition where the polymer for forming thermally modified polymer layer and the polymer for forming polymer member are different from each other, when the thermally modified polymer layer was used (Reference Examples 22 to 27), peeling of the polymer member was suppressed, as compared with the case where the thermally modified polymer layer was not used (Reference Comparative Examples 1, 3 and 4).

From Table R9 above, it is understood that, even under the condition where a silicon substrate with SiN formed on the surface thereof, a copper plate, and an aluminum plate were used as a substrate instead of a silicon substrate, when the thermally modified polymer layer was used (Reference Examples 28 to 30), peeling of the polymer member was suppressed, as compared with the case where the thermally modified polymer layer was not used (Reference Comparative Examples 5 to 7).

From Table R10 above, it is understood that, even under the condition where the substrate was a silicon substrate treated with a silane coupling agent, peeling of the polymer member was not suppressed as compared with the case where the thermally modified polymer layers were used (Reference Examples).

Reference Examples 31 to 36

A silicon substrate was used as an inorganic substrate, and a silicon substrate with thermally modified polymer layer was obtained on the silicon substrate in the same manner as in Reference Example 1, except that a solution for thermally modified polymer layer was obtained by mixing and stirring 20% by mass of COP1 and 80% by mass of chloroform at room temperature, and the temperature of the hot plate for thermal modification was changed to 400° C. (Reference Example 31), 320° C. (Reference Example 32), 280° C. (Reference Example 33), 240° C. (Reference Example 34), 200° C. (Reference Example 35), and 160° C. (Reference Example 36).

(Elemental Analysis by XPS)

For the thermally modified polymer layers of Reference Examples 31 to 36, a ratio of the number of oxygen atoms contained in the thermally modified polymer layer to the total number of oxygen atoms and carbon atoms contained in the thermally modified polymer layer (number of O atoms/(number of O atoms+number of C atoms) (%)) was determined using an XPS device (K-Alpha (from Thermo Fisher Scientific)).

Measurement was performed using monochromatized AlKα rays as an X-ray source and with a photoelectron extraction angle of 0 degree. The O1s peak area was determined by drawing a baseline according to Shirley method in the range of 527 to 537 eV, and the C1s peak area was determined by drawing a baseline according to Shirley method in the range of 280 to 290 eV. The oxygen concentration and carbon concentration on the surface of the film were obtained by correcting the above-mentioned O1s peak area and C1s peak area with a sensitivity coefficient inherent to respective devices.

Preparation conditions and evaluation results of the thermally modified polymer layer are shown in Table R11 below. It is understood from this Table R11 that as the temperature for the thermal modification decreases, i.e. as the degree of thermal modification decreases, this ratio (number of O atoms/(number of O atoms+number of C atoms) (%)) decreases. Therefore, it is understood that this ratio can be used as an index of the degree of thermal modification of a thermally modified polymer layer.

(Measurement of Infrared Absorption Spectrum)

For the thermally modified polymer layers of Reference Examples 31 to 36, infrared transmission absorption spectrum ranging from 4000 to 500 cm$^{-1}$ was measured using an IR absorption spectrometer (Nicolet 6700 (from Thermo Fisher Scientific)) to determine the ratio of the absorption peak intensity of C=O stretching vibration peaking at 1732 cm$^{-1}$ to the absorption peak intensity of C—H stretching vibration peaking at 2947 cm$^{-1}$ (ratio of the absorption peak intensity of C=O stretching vibration/the absorption peak intensity of C—H stretching vibration (—)). The absorption peak intensity was determined by reading the maximum value of the absorbance value of the absorption peak.

Preparation conditions and evaluation results of the thermally modified polymer layer are shown in Table R11 below. It is understood from the Table R11 that as the temperature for thermal modification decreases, i.e. as the degree of thermal modification decreases, this ratio (a ratio of absorption peak intensity of C=O stretching vibration/absorption peak intensity of C—H stretching vibration (—)) decreases. Therefore, it is understood that this ratio can be used as an index of the degree of thermal modification of a thermally modified polymer layer.

TABLE 13

Table R11

| | | | Thermally modified polymer layer | | | | | |
|---|---|---|---|---|---|---|---|---|
| | | Material | | | | | Number of O atoms/ | Ratio of |
| | | | | Polymer | Preparation condition | | (Number of O atoms + | absorption |
| | Inorganic substrate | Solvent | Polymer | concentration (mass %) | Temp. (° C.) | Time (min) | Number of O atoms (%) | intensity (−) |
| Ref.Ex.31 | S i | Chloroform | C O P 1 | 20 | 400 | 1 | (not measured) | 3.10 |
| Ref.Ex.32 | S i | Chloroform | C O P 1 | 20 | 320 | 1 | 7.1 | 0.25 |
| Ref.Ex.33 | S i | Chloroform | C O P 1 | 20 | 280 | 1 | 6.3 | 0.22 |
| Ref.Ex.34 | S i | Chloroform | C O P 1 | 20 | 240 | 1 | 0.1 | 0 |
| Ref.Ex.35 | S i | Chloroform | C O P 1 | 20 | 200 | 1 | 0.1 | 0 |
| Ref.Ex.36 | S i | Chloroform | C O P 1 | 20 | 160 | 1 | (not measured) | 0 |

REFERENCE SIGNS 10 inorganic substrate 20, 21, 22 thermally modified polymer layer 30, 31, 32 polymer member 110, 120 composite of thermally modified polymer layer and inorganic substrate 210, 220 composite of polymer member and inorganic substrate according to the present invention

What is claimed is:

1. A composite polymer member which is an anti-reflection film, comprising:
   a polymer member at least comprising inorganic particles and a cyclic olefin polymer, wherein the volume ratio of the olefin polymer to the inorganic particles is 5:95 to 95:5; and
   an additional polymer member at least comprising a cyclic olefin polymer,
   wherein the thicknesses of the polymer member and the additional polymer member are 10 μm or more and 1 cm or less, respectively,
   and wherein the polymer member is directly laminated onto the additional polymer member.

2. The composite polymer member according to claim 1, which is in the form of a membrane or film.

3. The composite polymer member according to claim 1, wherein the inorganic particles have the average primary particle diameter of 1 to 500 nm.

4. The composite polymer member according to claim 1, wherein at least one of the polymer member and the additional polymer member further comprises a coupling agent.

5. The composite polymer member according to claim 4, wherein
   the polymer member is in the form of a film and further comprises a coupling agent,
   the additional polymer member is in the form of a film, further comprises inorganic particles and does not comprise a coupling agent, and
   the composite polymer member is in the form of a film.

6. The composite polymer member according to claim 1, wherein the inorganic particles are at least one selected from particles of metal or metalloid, particles of an oxide or fluoride of metal or metalloid, and particles of compounds containing metal or metalloid, and wherein the metal and metalloid are at least one selected from the group consisting of Si, Ge, Mg, Ni, Cr, Fe, Cu, Au, Ag, W, Y, In, Ti and Ir.

7. The composite polymer member according to claim 1, wherein the inorganic particles are at least one selected from particles of metal or metalloid, particles of an oxide or fluoride of metal or metalloid, and particles of compounds containing metal or metalloid, and wherein the metal and metalloid are at least one selected from the group consisting of Si, Ge, Mg, Ni, Cr, Fe, Cu, Au, Ag, W, Y, In, and Ir.

\* \* \* \* \*